(12) United States Patent
Hung et al.

(10) Patent No.: US 8,268,137 B2
(45) Date of Patent: Sep. 18, 2012

(54) ELECTROCHEMICAL PROCESSING APPARATUS AND PROCESSING METHOD THEREOF

(75) Inventors: Jung-Chou Hung, Fongshan (TW); Dayu Lin, Daya Township, Taichung County (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 920 days.

(21) Appl. No.: 12/342,107

(22) Filed: Dec. 23, 2008

(65) Prior Publication Data

US 2010/0101932 A1 Apr. 29, 2010

(30) Foreign Application Priority Data

Oct. 24, 2008 (TW) .............................. 97141008 A

(51) Int. Cl.
*B23H 7/26* (2006.01)
(52) U.S. Cl. ........................................ 204/225; 205/651
(58) Field of Classification Search .................. 204/225; 205/651
See application file for complete search history.

(56) References Cited

U.S. PATENT DOCUMENTS

| | | | | |
|---|---|---|---|---|
| 5,159,224 A | * | 10/1992 | Kramer et al. | 310/323.09 |
| 5,773,781 A | * | 6/1998 | Sawada et al. | 219/69.2 |
| 6,835,299 B1 | * | 12/2004 | Tchugunov | 205/654 |
| 7,004,693 B2 | * | 2/2006 | Adachi et al. | 409/144 |
| 8,034,228 B2 | * | 10/2011 | Bayer et al. | 205/651 |
| 2006/0131184 A1 | * | 6/2006 | Mielke | 205/651 |
| 2010/0201224 A1 | * | 8/2010 | Gaber | 310/323.02 |

FOREIGN PATENT DOCUMENTS

| | | |
|---|---|---|
| JP | 57-89519 A | 3/1982 |
| JP | 2006-82188 A | 3/2006 |

OTHER PUBLICATIONS

U.S. Appl. No. 60/973,512, filed Sep. 19, 2007.*

* cited by examiner

*Primary Examiner* — Nicholas A. Smith
(74) *Attorney, Agent, or Firm* — Ming Chow; Sinorica, LLC

(57) ABSTRACT

The present invention relates an electrochemical processing apparatus and a processing method thereof. A reciprocating swing unit is used to drive the processing electrode to process a workpiece, and thus simplifying fabrication of the processing electrode, and shortening processes and reducing costs. In addition, by using a high-frequency reciprocating twist and micro-vibrating unit to drive the processing electrode to perform high-frequency reciprocating twists and micro-vibrations, the processing electrode can perform twist without varying the processing gap. Thereby, the electrolyte in the gap can be perturbed and renewed continuously. Accordingly, bubbles and products produced during electrolysis can be removed sufficiently, enhancing processing precision and surface quality using the processing electrode on processing the workpiece.

11 Claims, 15 Drawing Sheets

ELECTROCHEMICAL PROCESSING APPARATUS AND PROCESSING METHOD THEREOF

FIELD OF THE INVENTION

The present invention relates generally to a processing apparatus and a processing method thereof, and particularly to an electrochemical processing apparatus and a processing method thereof.

BACKGROUND OF THE INVENTION

FIG. 1 shows a structural schematic diagram of an electrochemical processing apparatus according to the prior art. As shown in the figure, the electrochemical processing apparatus according to the prior art maintains a stable gap between the processing electrode 20' and the workpiece 30' by means of downward feed of the spindle 5'. Thereby, the balance gap required by processing is maintained and the processing precision and surface quality can be achieved as well. When the apparatus performs an electrochemical process, a gap exists between the processing electrode 20' and the workpiece 30'. The portion material of the workpiece 30' will thereby precipitate in the electrolyte of the gap due to electrolysis, and thus a shape corresponding to the processing electrode 20' can be formed on the workpiece 30'. Because the gap is extremely narrow or the external propulsion capability of the circulation of electrolyte is insufficient, the products of electrolysis cannot be removed completely and promptly. Consequently, the processing precision of the workpiece 30' in the processing region is inferior, or the products of electrolysis will adhere to the workpiece 30'.

FIG. 2 and FIG. 3 show improvements on the drawbacks of the prior art described above. In order to renew the electrolyte in the gap sufficiently, mechanisms such as a crank, and a motor or an up-and-down micro-vibrator 70' are set on the spindle for connecting to the processing electrode 20'. When an electrochemical process is performed, the processing electrode 20' will vibrate up and down so that the electrolyte in the gap can be renewed sufficiently. However, the complexity of the apparatus and the processing cost will increase accordingly. Besides, the up-and-down vibration of the electrode varies the width of the gap, resulting in unstable electrolysis owing to varying distribution of electric filed following the vibration, which is disadvantageous to process stability and tracking control of the inter-electrode gap. Furthermore, as shown in FIG. 1, the electrochemical processing apparatus uses the spindle 5' for driving the processing electrode 20' to move linearly in the Z-axis and then perform electrochemical process on the workpiece 30'. Thereby the shape of the processing electrode 20' used in the apparatus complements with the shape on the workpiece 30'. Consequently, it takes long processing time and higher processing cost to fabricate the processing electrode 20'.

SUMMARY

An objective of the present invention is to provide an electrochemical processing apparatus and a processing method thereof. By using a reciprocating swing unit to drive an electrode, a workpiece is processed. Thereby, the shape of the processing electrode can be simplified, the fabrication process can be shortened, and the processing cost can be reduced.

Another objective of the present invention is to provide an electrochemical processing apparatus and a processing method thereof. The high-frequency reciprocating twist and micro-vibrating unit is used for driving the electrode to perform high-frequency reciprocating twists and micro-vibrations. Thereby, the electrode can twist and micro-vibrate in the processing gap to perturb the electrolyte and to help renewing the electrolyte continuously. Hence, the electrolysis products and bubbles can be removed completely, and the processing precision and surface quality can be enhanced.

The electrochemical processing apparatus according to the present invention comprises a spindle, a reciprocating swing unit, and an electrode. The reciprocating swing unit is set on the spindle; the electrode is set on the reciprocating swing unit. The spindle provides linear feed and the reciprocating swing unit for driving the electrode to process on the workpiece. Thereby, the fabrication of the processing electrode can be simplified, the process can be shortened, and the processing cost can be reduced.

The present invention further comprises a reciprocating twist and micro-vibrating unit, which is put around a shaft of the electrode. A high-frequency reciprocating twist and micro-vibrating unit is used for driving the electrode to perform high-frequency reciprocating twists and micro-vibrations. Thereby, the electrode can twist and micro-vibrate in the processing gap to perturb the electrolyte and to help renewing the electrolyte continuously. Hence, the electrolysis products and bubbles can be removed completely, and the processing precision and surface quality can be enhanced.

The processing method of an electrochemical processing apparatus according to the present invention comprises steps of: setting a workpiece in an electrolyte; setting the workpiece underneath a processing electrode of the electrochemical processing apparatus; starting the electrochemical processing apparatus to perform electrochemical processing; and starting a reciprocating swing unit of the electrochemical processing apparatus, for driving the processing electrode to undergo linear feed and reciprocating twist electrochemical processes.

According to the present invention, the reciprocating twist and micro-vibrating unit, used for driving the electrode in an electrochemical processing to perform micro-vibrations, comprises an inner ring and an outer ring, the outer rings set on the outer side of the inner ring; a plurality of ribs, connected between the outer ring and the inner ring; and a plurality of piezoelectric actuation devices, set on one side of the ribs, respectively.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1:
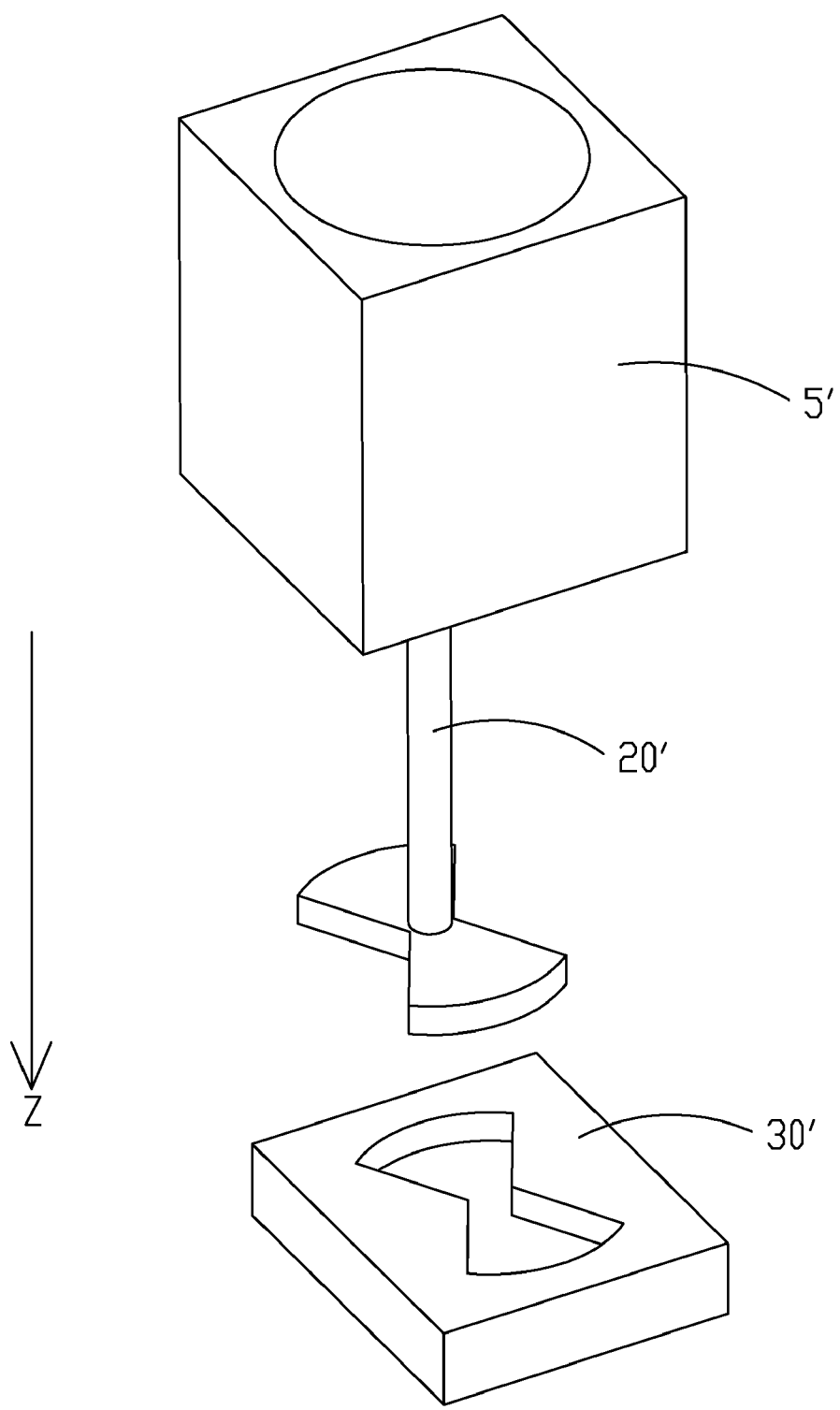
FIG. 1 shows a structural schematic diagram of an electrochemical processing apparatus according to the prior art.
Figure 2:
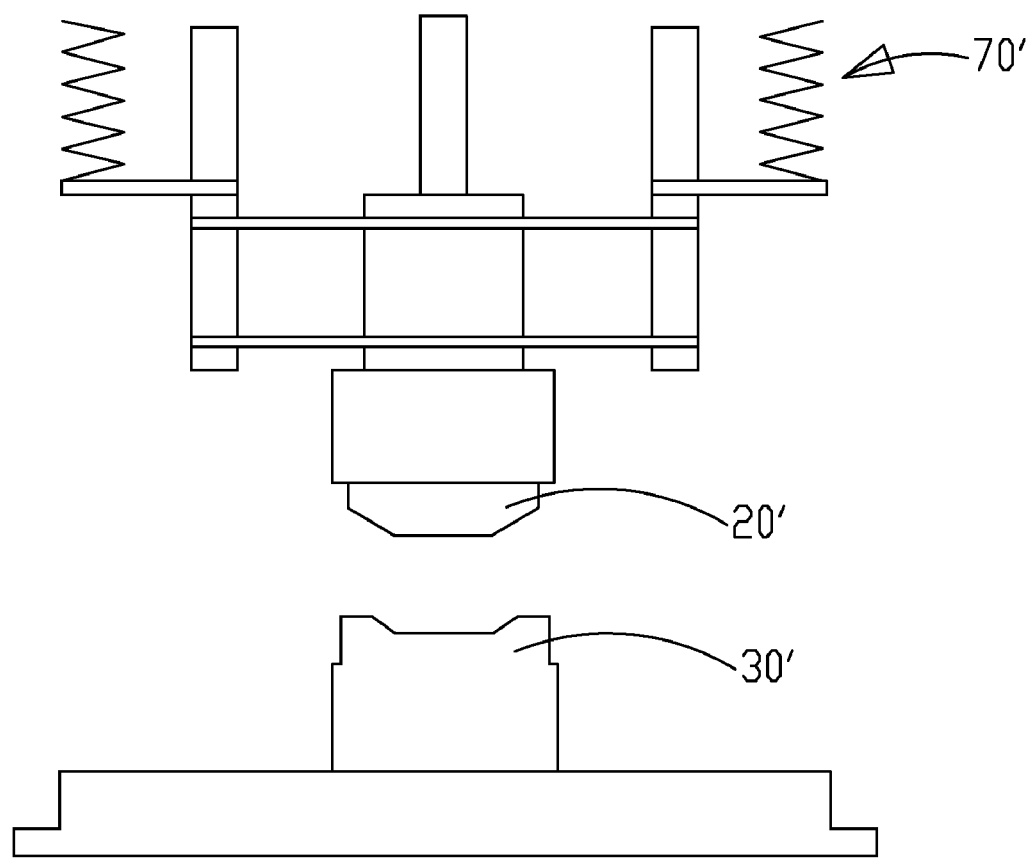
FIG. 2 shows a structural schematic diagram of an electrochemical processing apparatus according to another the prior art.
Figure 3:
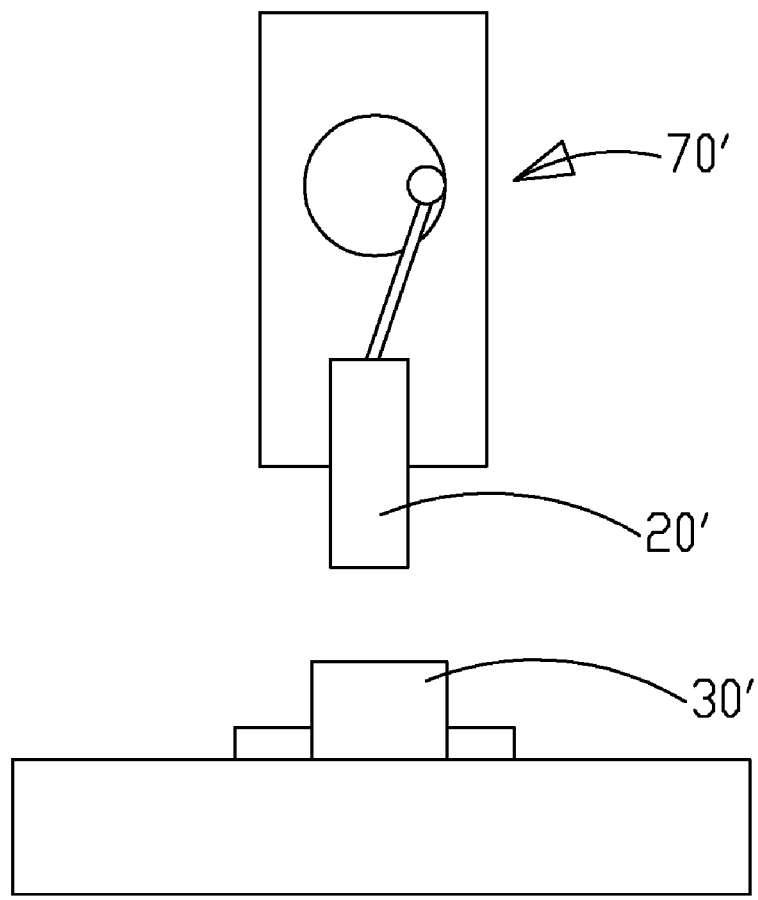
FIG. 3 shows a structural schematic diagram of an electrochemical processing apparatus according to another the prior art.
Figure 4:
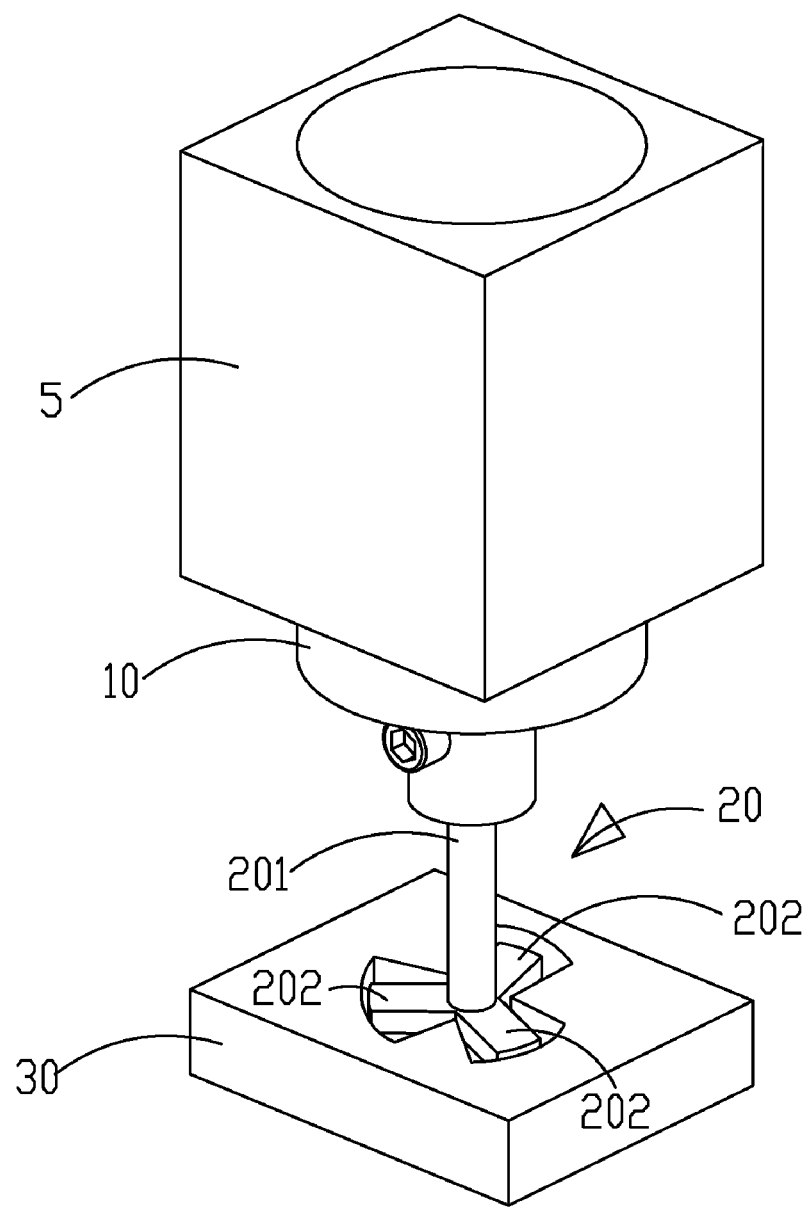
FIG. 4 shows a three-dimensional view of an electrochemical processing apparatus according to a preferred embodiment of the present invention.

FIG. 4 shows a three-dimensional view of an electrochemical processing apparatus according to a preferred embodiment of the present invention. As shown in the figure, the electrochemical processing apparatus according to the present invention comprises a spindle 5, a reciprocating swing unit 10, and a processing electrode 20. The reciprocating swing unit 10 is set on the spindle 5; the processing electrode 20 is set fixed on the reciprocating swing unit 10. The processing electrode 20 includes a shaft 201 and a processing part 202. The shaft 201 is assembled to the reciprocating swing unit 10. Thereby, when the electrochemical processing apparatus operates, the spindle 5 will drive the reciprocating swing unit 10 to perform linear movement and feed. The reciprocating swing unit 10 will, in turn, drive the processing electrode 20 to perform reciprocating swing. Thereby, the processing electrode 20 will be fed linearly and be driven to perform reciprocating swing while the processing electrode 20 performs electrochemical electrolysis processing on the workpiece 30. Besides, a control unit (not shown in the figure) is used to control the swing angle or amplitude of the reciprocating swing unit 10 when the processing part 202 of the processing electrode 20 performs electrochemical processing on the workpiece 30 in a swinging manner. Because the processing electrode 20 performs electrochemical processing on the workpiece 30 in a reciprocating swinging manner, the trench pattern on the workpiece 30 is the swinging area swept by the processing part 202. Thereby, the shape of the processing part 202 of the processing electrode 20 is not necessarily complementary to the opening to be processed electrochemically. Hence, the processing part 202 is not limited by the processing area and processing type on the workpiece 30. So, in which will simplify the shape of the processing electrode 20 to reduce processes and costs. Moreover, by means of the control unit, the swinging angle or amplitude of the reciprocating swing unit 10 can be adjusted to make the processing electrode 20 fit a variety of processing conditions. That is, for openings with different widths, it is not necessary to prepare another processing electrode 20. The processing electrode 20 according to the present invention is moderately universal and economical.

Figure 5:
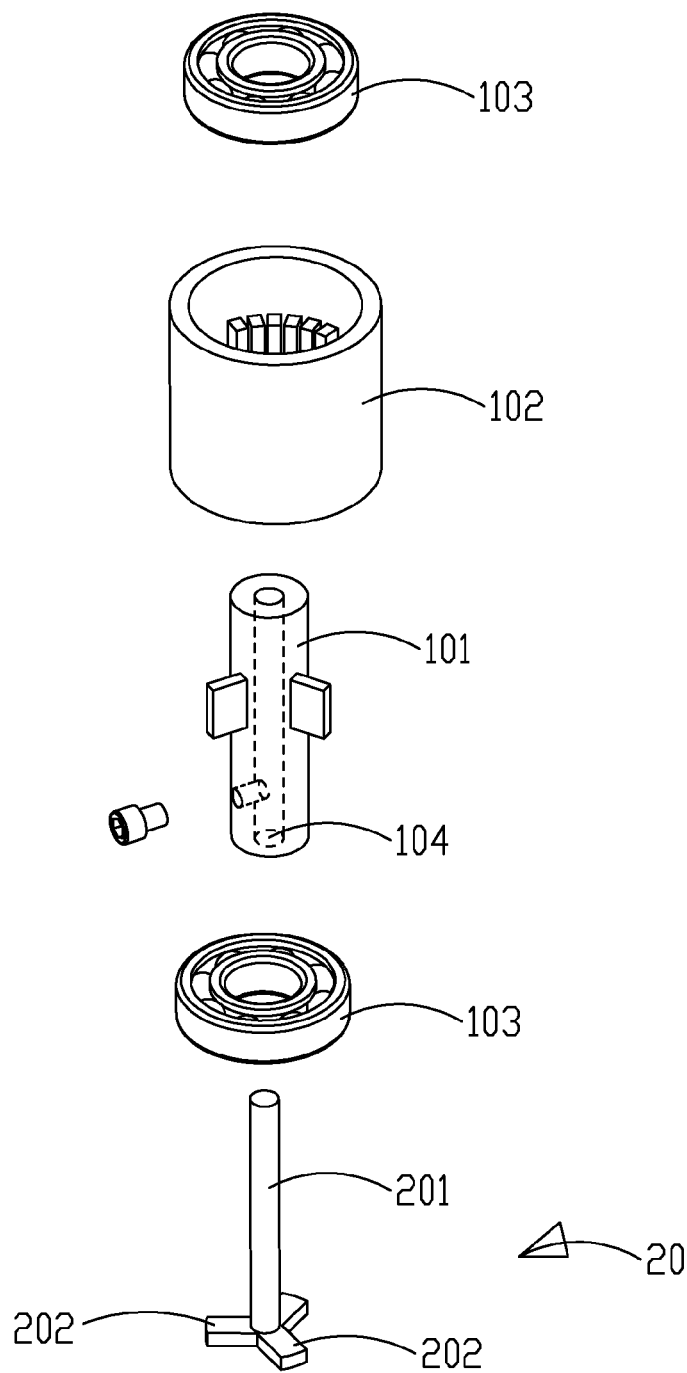
FIG. 5 shows an exploded view of the reciprocating swing unit according to a preferred embodiment of the present invention.
Figure 6:
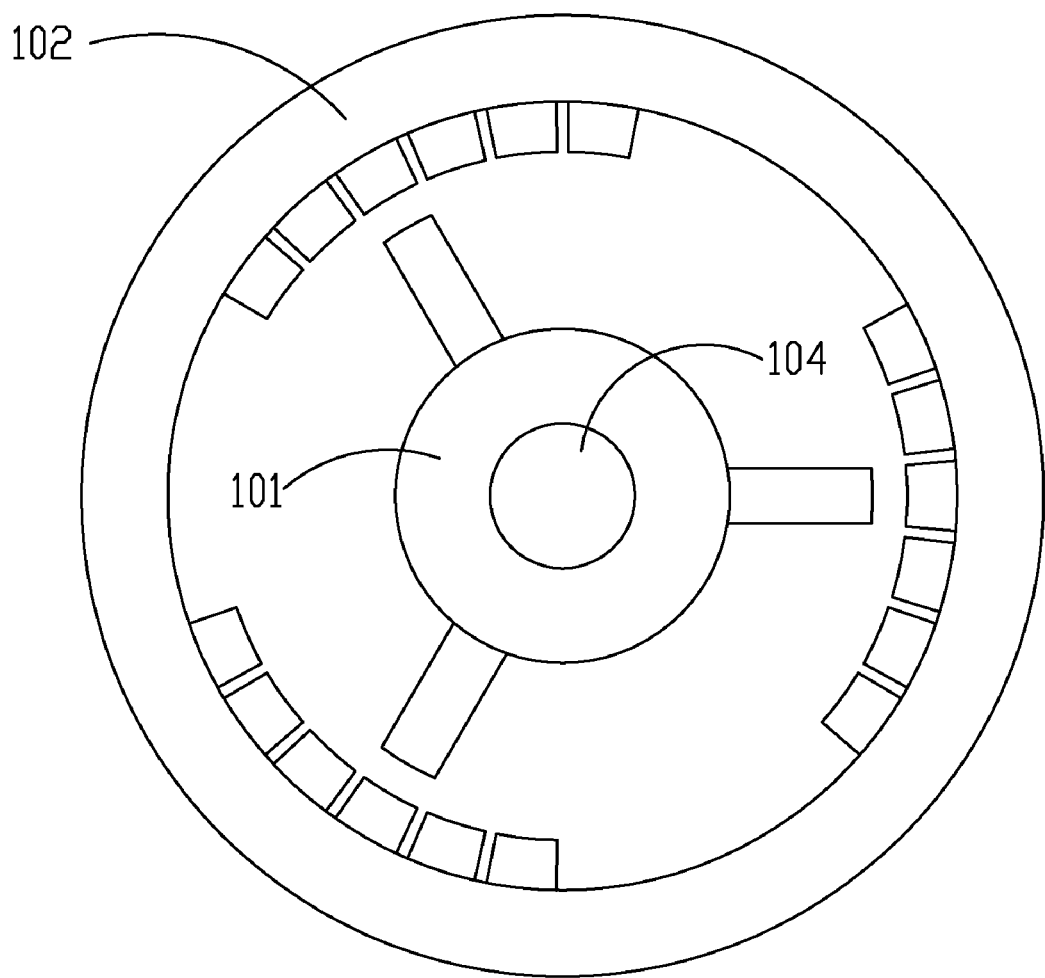
FIG. 6 shows a top view of the rotor set in the stator of the reciprocating swing unit according to a preferred embodiment of the present invention.

FIGS. 5 and 6 show an exploded view and a top view of the reciprocating swing unit according to a preferred embodiment of the present invention. As shown in the figures, the reciprocating swing unit 10 includes a rotor 101, a stator 102, and two rotation supporting devices 103. The rotor 101 passes though the stator 102. The stator 102 surrounds the periphery of the rotor 101. The stator 102 is set fixed on the spindle 5. The processing electrode 20 is connected to the rotor 101. A hole 104 is set at the center of the rotor 101. The processing electrode 20 is set through the hole 104 and is fixed on the rotor 101. Thereby, the shaft 201 of the processing electrode 20 is put into the hole 104 of the rotor 101. The two rotation supporting devices 103 are set on both sides of the rotor 101 and the stator 102. The control unit controls the swinging angle, frequency, and time of the reciprocating swing unit 10 to make the reciprocating swing unit 10 drive the processing electrode 20 to perform reciprocating movements. Thus, electrochemical electrolysis process can be performed.

Figure 7A:
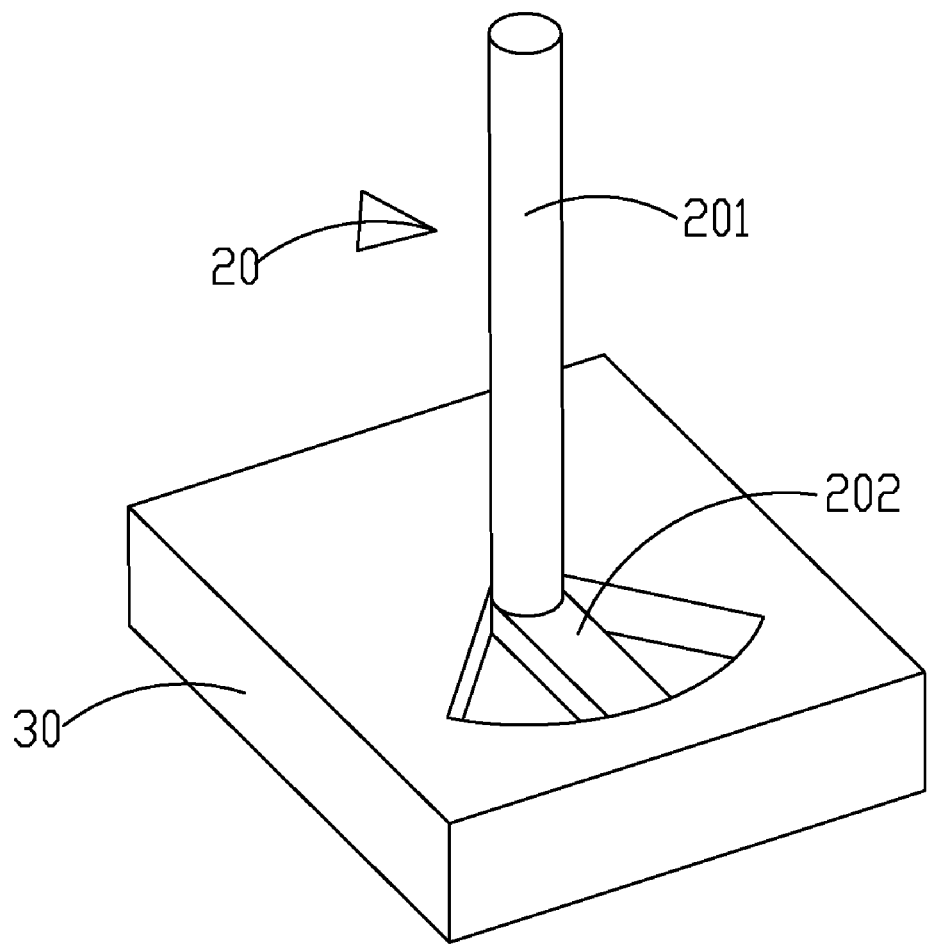
FIG. 7A shows a structural schematic diagram of an electrode according to another preferred embodiment of the present invention.

FIG. 7A shows a structural schematic diagram of an electrode according to another preferred embodiment of the present invention. As shown in the figure, the processing electrode 20 according to the present invention includes a shaft 201 and a processing part 202. The shaft 201 is connected to the reciprocating swing unit 10; the processing part 202 is connected to the shaft 201. The processing part 202 according to FIG. 7A is slab- or pole-shaped (or other shapes). When the processing part 202 is moved by the operation of the reciprocating swing unit 10, the workpiece 30 can produce a fan-shaped trench. Thereby, the fabrication of the processing electrode can be simplified, reducing processes and costs.

Figure 7B:
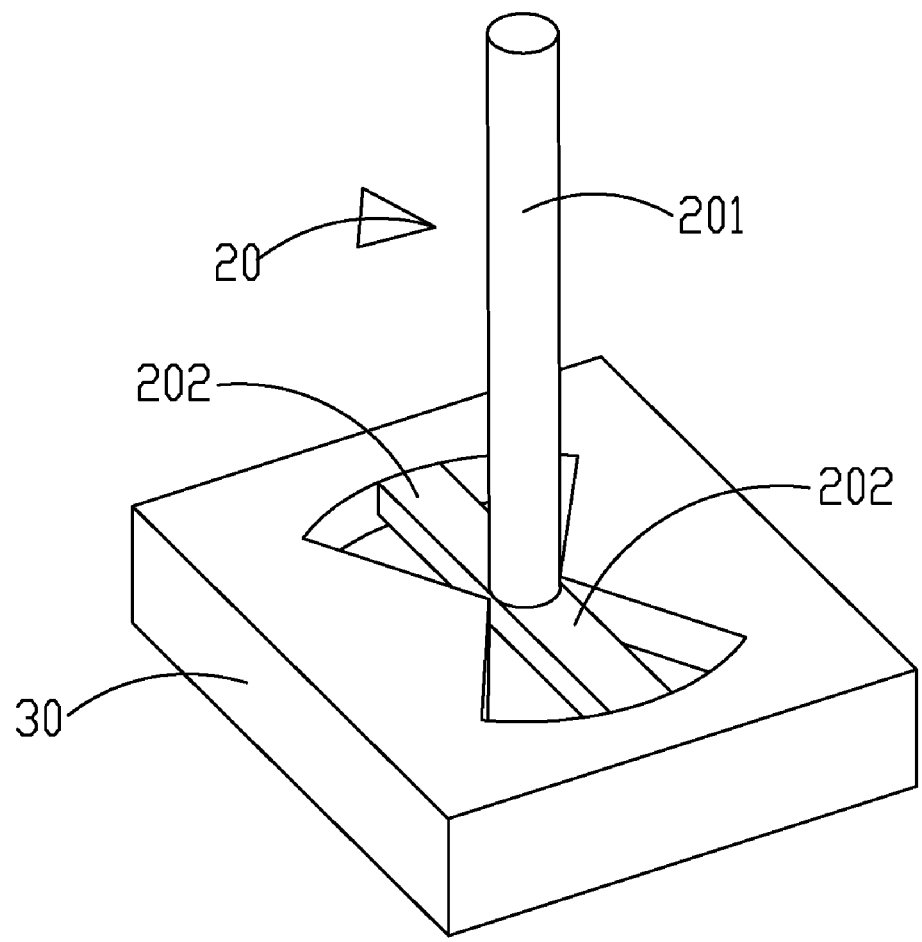
FIG. 7B shows a structural schematic diagram of an electrode according to another preferred embodiment of the present invention.

FIG. 7B shows a structural schematic diagram of an electrode according to another preferred embodiment of the present invention. As shown in the figure, the difference between the present preferred embodiment and the previous one is that, according to the present preferred embodiment, the processing electrode 20 includes a plurality of processing parts 202. In this embodiment, the processing electrode 20 has two processing parts 202 with a 180-degree angle therebetween, forming slab- or pole-shaped across two sides. Thereby, by means of the two linear processing parts 202, two fan-shaped trenches communicating with each other can be produced, simplifying the fabrication of the processing electrode 20 and thus reducing processes and costs. According to the present invention, multiple processing parts can be included. The processing electrode 20 shown in FIG. 8 includes three processing parts 202 with a 120-degree angle between two adjacent processing parts 202. According to the description above, the number of processing part 202 can be set arbitrarily according to demand. In addition, the angle between two adjacent processing parts 202 can be set freely according to demand as well. Hence, flexibility in using the present invention is enhanced.

Figure 7C:
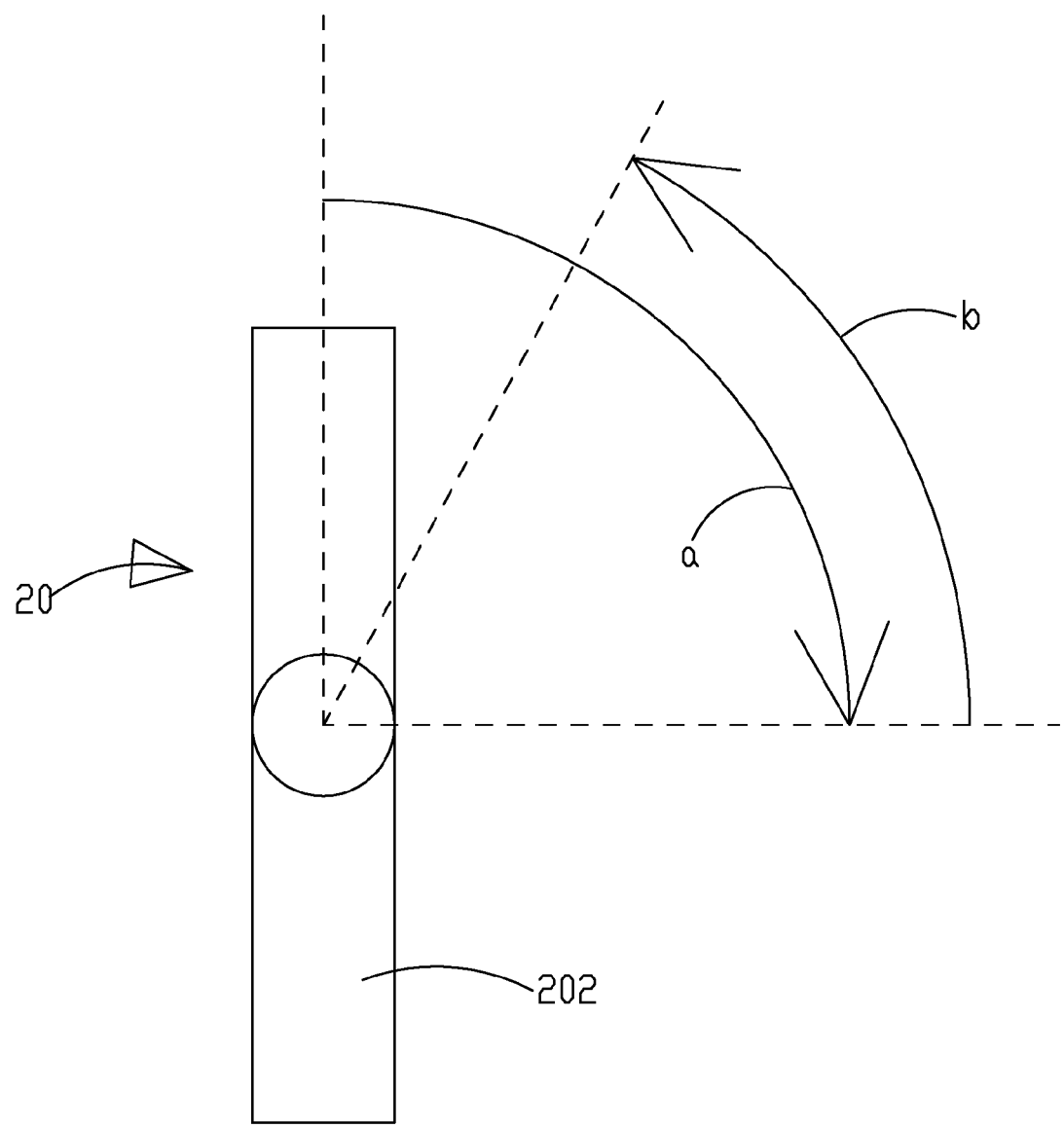
FIG. 7C shows a schematic diagram of the angular movement made by the swing of the processing electrode according to the present invention.
Figure 7D:
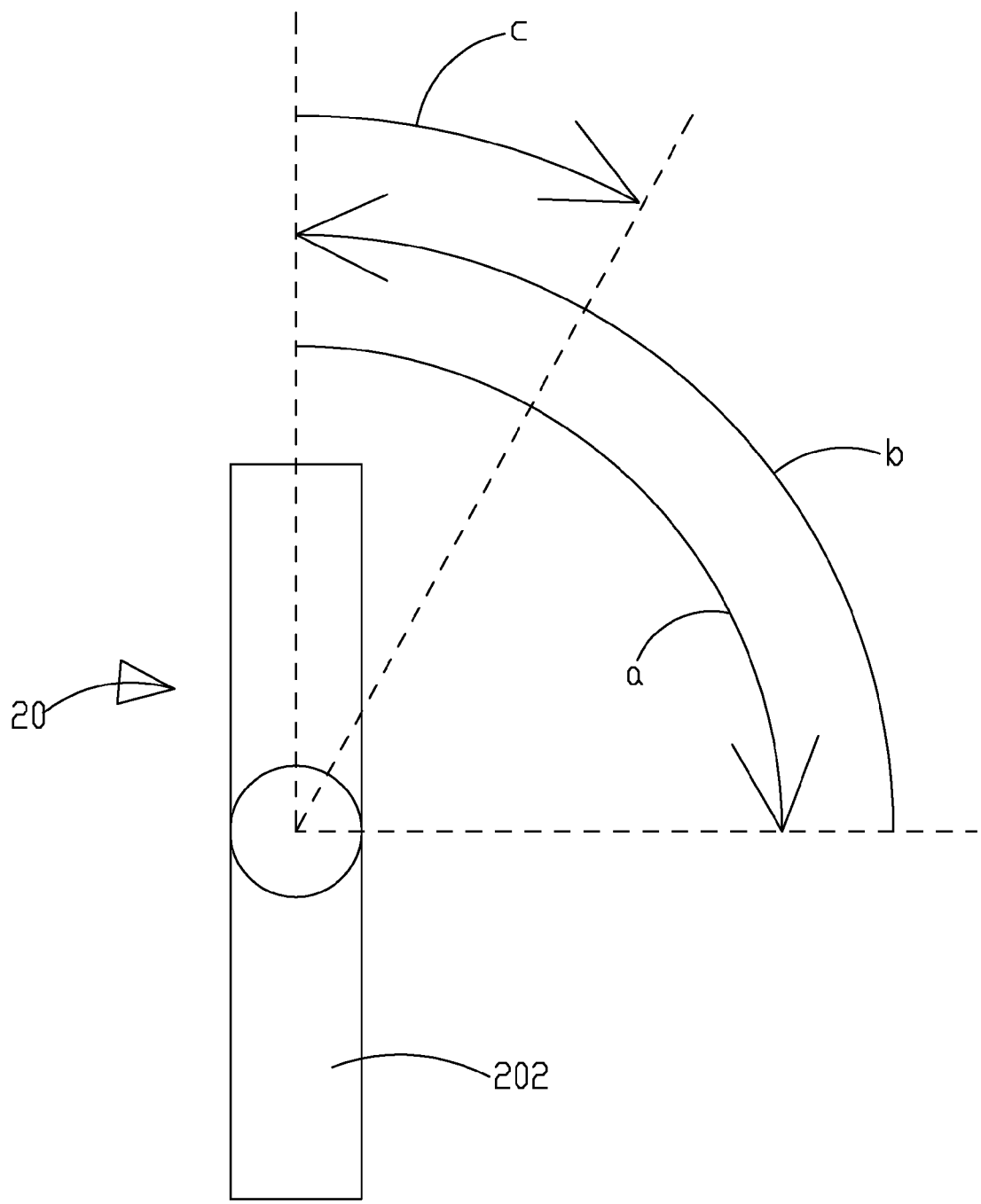
FIG. 7D shows another schematic diagram of the angular movement made by the swing of the processing electrode according to the present invention.
Figure 7E:
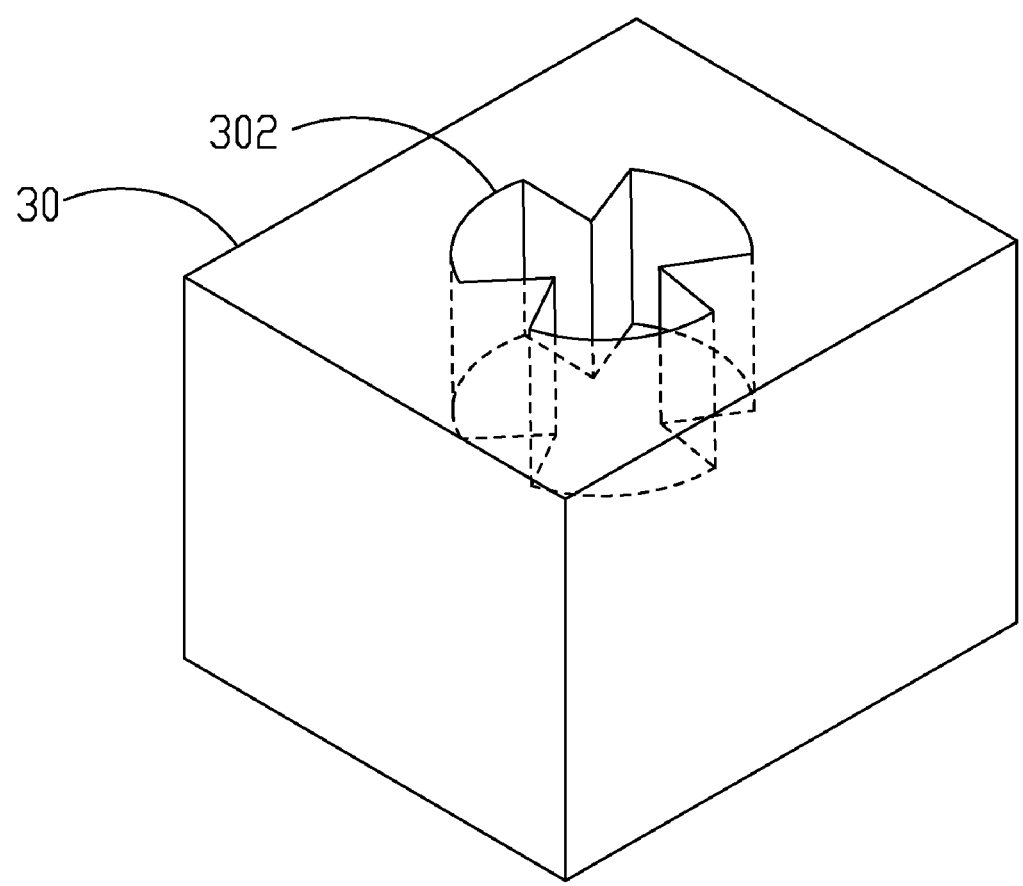
FIG. 7E shows a diagram of the cylinder trench according to the present invention.
Figure 7F:
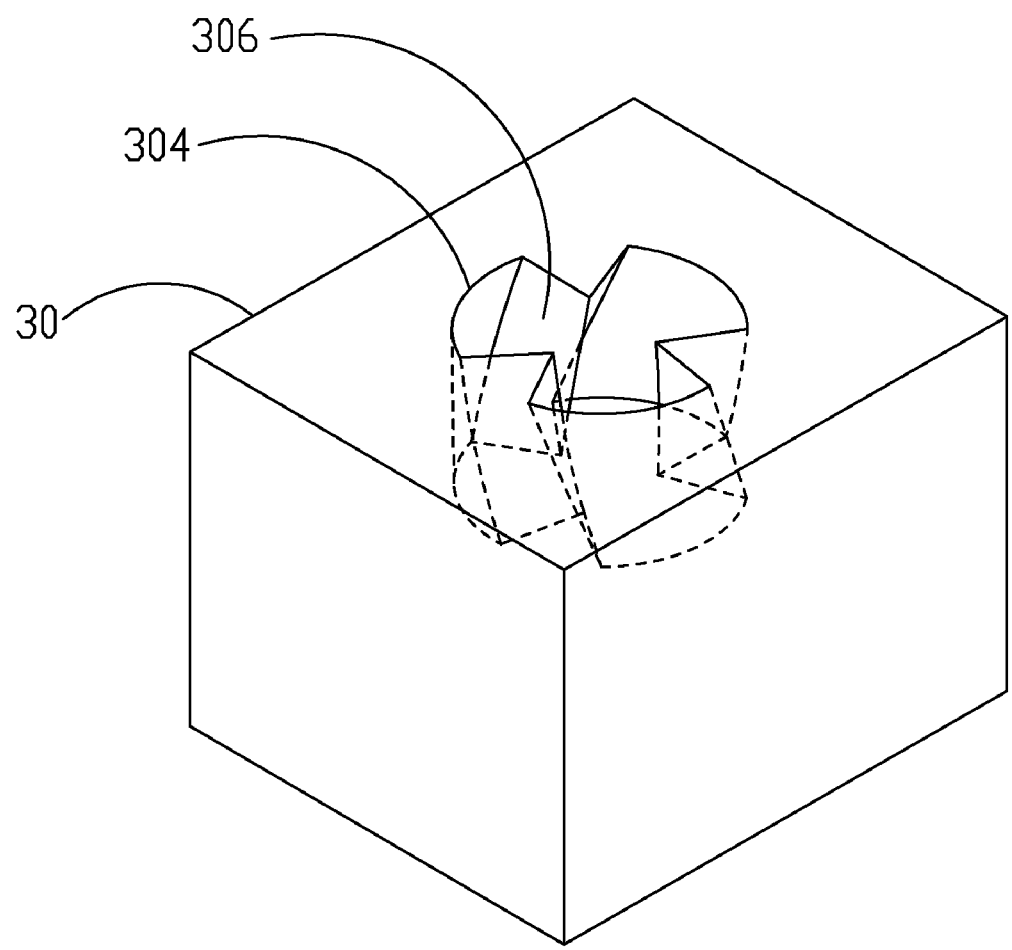
FIG. 7F shows a diagram of the spiral trench according to the present invention.

Furthermore, referring to FIG. 7C, according to the present invention, by setting the twist feed angle a and the rewinding angle b of the reciprocating swing unit 10, in which the twist feed angle a is greater than the rewinding angle b, the processing electrode 20 can twist and swing, and achieving the effect of shifting the twist and swing angles of the processing electrode 20. Of course, it is also possible to set the twist feed angle a smaller than the rewinding angle b, in which case the twist and swing angles of the processing electrode 20 will be shifted to the other direction. That is to say, by setting different values of the twist feed angle and the rewinding angle b, the effect of shifting the twist and swing angles can be achieved. Furthermore, the twist feed angle a can be equal to the rewinding angle b. After the processing electrode 20 undergoes twist feed angle and rewinding angle, perform an incremental swing angle c, as shown in FIG. 7D. By repeating the actions described above with the accompanying vertical feed of the spindle 5, three-dimensional processing patterns, such as cylinder or spiral trenches (as shown in FIGS. 7E and 7F), can be performed. FIG. 7E shows the cylinder trench 302 on the workpiece 30. FIG. 7F shows the spiral trench 304 on the workpiece 30 and the spiral trench 304 includes a plurality of inclining areas 306. Thereby, the applications of electrochemical processing according to the present invention are widened with more industrial values.

Figure 8:
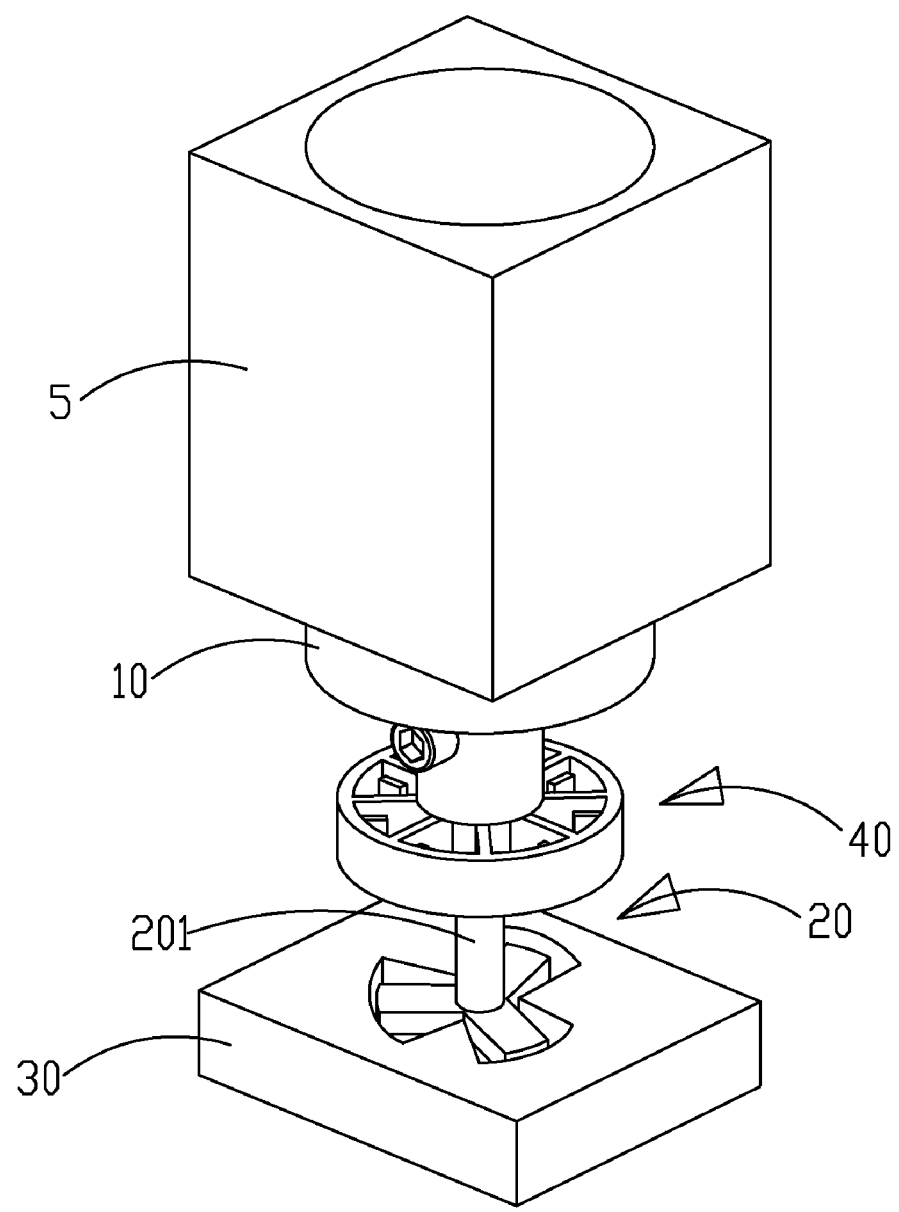
FIG. 8 shows a three-dimensional view of an electrochemical processing apparatus according to another preferred embodiment of the present invention.
Figure 9:
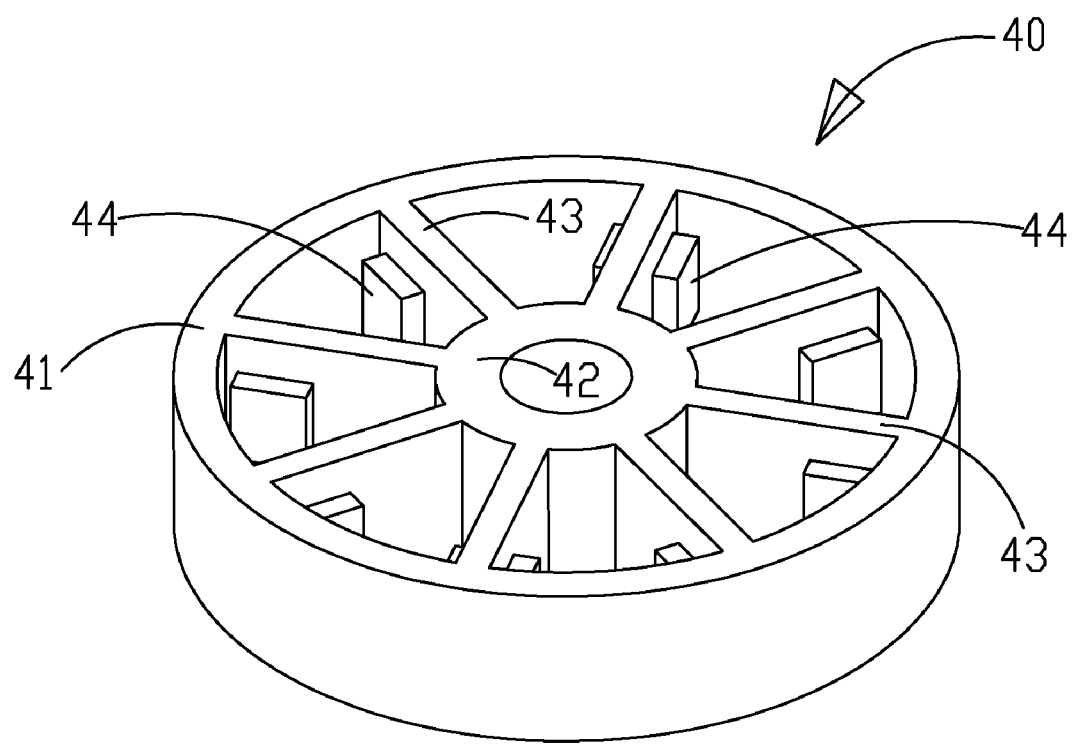
FIG. 9 shows a three-dimensional view of the reciprocating twist and micro-vibrating unit according to a preferred embodiment of the present invention.

FIGS. 8 and 9 show three-dimensional views of an electrochemical processing apparatus and of the reciprocating twist and micro-vibrating unit according to another preferred embodiment of the present invention. As shown in the figures, because removal of bubbles and processing products has significant influences on the quality of fine electrochemical electrolysis, in order to enhance processing precision and effects of electrochemical electrolysis, the electrochemical processing apparatus according to the present invention further includes a reciprocating twist and micro-vibrating unit 40. The reciprocating twist and micro-vibrating unit 40 can be controlled by the control unit and is used for producing high-frequency micro-vibrations. The reciprocating twist and micro-vibrating unit 40 is put around the shaft 201 of the processing electrode 20 for providing the processing electrode 20 with the capability of high-frequency reciprocating twists and micro-vibrations. By means of the reciprocating twist and micro-vibrating unit 40, the processing electrode 20 is driven to perform high-frequency reciprocating twists and micro-vibrations. Thereby, the processing electrode 20 performs twists with micro-variations in the processing gap. Owing to the perturbation in the gap, electrolyte is renewed continuously, and thus the electrolysis products and bubbles produced during electrolysis can be removed sufficiently. Accordingly, stability of current density is enhanced during processing, and hence processing precision and surface quality are improved.

The reciprocating twist and micro-vibrating unit 40 includes an outer ring 41, an inner ring 42, a plurality of ribs 43, and one or more piezoelectric actuation devices 44. In this embodiment, the reciprocating twist and micro-vibrating unit 40 includes a plurality of piezoelectric actuation devices 44. The inner ring 42 is put around the shaft 201. The outer ring 41 is on the outer side of the inner ring 42. The plurality of ribs 43 connects the outer ring 41 and the inner ring 42 in a radial fashion. The plurality of piezoelectric actuation devices 44 is set on one side of the ribs 43. That is, the piezoelectric actuation devices 44 are set on the same sides of the plurality of ribs 44.

According to the present invention, by controlling the operation of the piezoelectric actuation devices 43 by the control unit, the processing electrode 20 can produce high-frequency reciprocating twists and micro-vibrations. Besides, in order to increase the amplitude of the reciprocating twist and micro-vibrating unit 40, the piezoelectric actuation devices 44 can be further set on the other side of the ribs 43. Namely, the piezoelectric actuation devices 44 are set on both corresponding sides of the ribs 43. By conducting power with opposite polarity, the vibrations produced by the reciprocating twist and micro-vibrating unit 40 can be multiplied.

Accordingly, by the micro-expansion and contraction characteristics of the piezoelectric actuation when applying a voltage, the plurality of ribs 43 can have reciprocating thrust simultaneously. Then the inner ring 42 is driven to perform reciprocating left-and-right twists and micro-vibrations, which, in turn, drives the processing electrode 20 to perform reciprocating rewinding and micro-vibrations as well. Thereby, while performing electrochemical processing, the electrolyte between the processing electrode 20 and the workpiece 30 is perturbed, enhancing sufficient renewal of the electrolyte therebetween. Hence, adherence of processing products is reduced. In addition, the electrolysis products and bubbles produced during electrolysis can be removed sufficiently, and processing precision and surface quality are thus improved.

Figure 10:
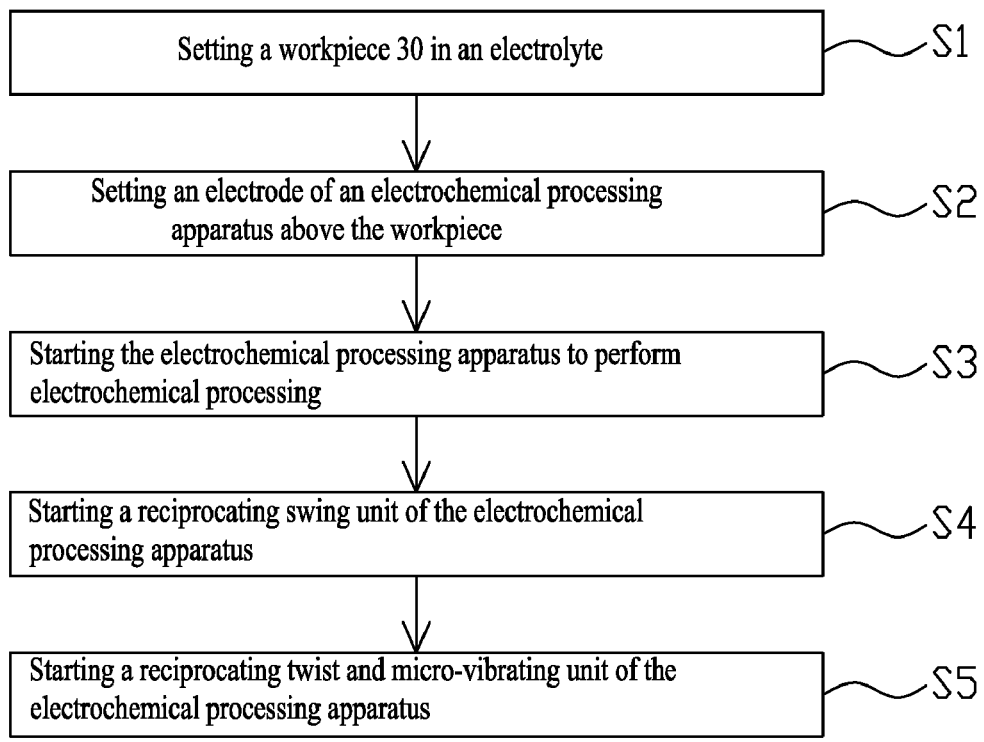
FIG. 10 shows a flowchart of the processing method according to the present invention.

FIG. 10 shows the processing method of the electrochemical processing apparatus according to the present invention comprises the following steps: First, the step S1 is performed for setting a workpiece 30 in an electrolyte. Then, the step S2 is performed for setting an electrode of an electrochemical processing apparatus above the workpiece. Namely, the workpiece 30 is set on the processing position underneath the processing electrode 20. Next, the step S3 is performed for starting the electrochemical processing apparatus to perform electrochemical processing. Afterwards, the step S4 is performed for starting a reciprocating swing unit 10 of the electrochemical processing apparatus. The reciprocating swing unit 10 is controlled by a control unit. The control unit controls the reciprocating swing unit 10 to swing reciprocatedly, or to rotate unidirectionally. By means of the control unit, the reciprocating swing unit 10 is controlled to drive the processing electrode 20 for performing electrochemical processing with reciprocating twists on the workpiece 30. The electrochemical processing apparatus also includes vertical feed of the processing electrode 20 driven by the spindle 5.

The reciprocating swing of the reciprocating swing unit 10 will drive the processing electrode 20 to sweep an area on the workpiece 30. If the angle of the reciprocating swing of the reciprocating swing unit 10 is fixed or not fixed for driving the processing electrode 20 to perform electrochemical processing, and if the reciprocating swing unit 10 (or the spindle 5) can shift its angle gradually to one direction (referring to FIGS. 7C and 7D), or can further match up the vertical feed of the processing electrode 20, then a spiral processing trench (referring to FIG. 7F) will be fabricated, further enhancing the applications of the electrochemical processing apparatus according to the present invention. Thereby, according to the present invention, not only the shape of the processing electrode 20 is simplified, but also the processes of the fabrication are shortened and the costs are reduced. After the step S4, the step S5 is further included for starting a reciprocating twist and micro-vibrating unit 40 of the electrochemical processing apparatus. The reciprocating twist and micro-vibrating unit 40 driver the processing electrode 20 to perturb the electrolyte in the gap between the processing electrode 20 and the workpiece 30. Thereby, the processing products adherence to the electrode 20 will be reduced, improving stability and precision of the electrochemical processing.

To sum up, the electrochemical processing apparatus and the method thereof according to the present invention simplify the shape of the processing electrode, and hence shortening processes and reducing costs. Meanwhile, the processing electrode can perform twists without varying the processing gap. The perturbation incurred helps to renew the electrolyte in the gap continuously and to remove electrolysis products. Consequently, the processing precision and surface quality using the processing electrode for processing the workpiece are enhanced.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. An electrochemical processing apparatus, comprising:
   a spindle, providing linear feed;
   a reciprocating swing unit, connecting to the spindle;
   an electrode, connecting to the reciprocating swing unit; and
   a reciprocating twist and micro-vibrating unit, putting around the electrode;
   wherein the reciprocating twist and micro-vibrating unit includes:
   an inner ring, putting around the spindle;
   an outer ring, setting around the outer side of the inner ring, upper ends of the outer ring and the inner ring setting on a same horizontal plane; and
   a plurality of ribs, used for mounting a plurality of piezoelectric actuation devices on one side surface thereof, and connected between the outer ring and the inner ring, the piezoelectric actuation devices thrusting the plurality of ribs in a same direction simultaneously for driving the outer ring and the inner ring to perform the reciprocating twist and micro-vibration in a same vibration direction simultaneously, so the reciprocating twist and micro-vibration unit drives the electrode to perform the reciprocating twist and micro-vibration in a same vibration direction simultaneously.

2. The electrochemical processing apparatus of claim 1, wherein the reciprocating swing unit includes:
   a stator, setting fixed on the spindle;
   a rotor, passing through the stator, and the electrode set on the rotor; and
   two rotation support devices, putting around both sides of the rotor, and set on both sides of the stator.

3. The electrochemical processing apparatus of claim 2, wherein the rotor has a hole at the center thereof, and the electrode is put into and is set in the hole.

4. The electrochemical processing apparatus of claim 1, wherein the reciprocating twist and micro-vibrating unit includes one or more piezoelectric actuation devices.

5. The electrochemical processing apparatus of claim 1, wherein the piezoelectric actuation device is set on one side of the ribs.

6. The electrochemical processing apparatus of claim 1, wherein the electrode includes:
   a shaft, connected on the reciprocating swing unit; and
   one or more processing part, connected on the shaft.

7. The electrochemical processing apparatus of claim 6, wherein the processing part is slab- or pole-shaped.

8. The electrochemical processing apparatus of claim 6, wherein the electrode includes a plurality of processing parts with angles between adjacent processing parts being 180 or 120 degrees.

9. The electrochemical processing apparatus of claim 5, wherein the piezoelectric actuation device is further set on both corresponding sides of the ribs.

10. A reciprocating twist and micro-vibrating unit, used for driving the electrode in an electrochemical processing to perform micro-vibrations, comprising:
    an inner ring and an outer ring, the outer ring set around the outer side of the inner ring, upper ends of the outer ring and the inner ring setting on a same horizontal plane;
    a plurality of ribs, connected between the outer ring and the inner ring; and
    a plurality of piezoelectric actuation devices, mounting on one side surface of the ribs, respectively, the piezoelectric actuation devices thrusting the plurality of ribs in a same direction simultaneously for driving the outer ring and the inner ring to perform the reciprocating twist and micro-vibration in a same vibration direction simultaneously.

11. The reciprocating twist and micro-vibrating unit of claim 10, wherein the piezoelectric actuation devices are further set on both corresponding sides of the ribs.

* * * * *